United States Patent [19]

Nuita et al.

[11] Patent Number: 5,063,395

[45] Date of Patent: Nov. 5, 1991

[54] THERMAL PRINTER HAVING A PLATEN WHICH CAN BE PRESSED AGAINST A THERMAL HEAD

[75] Inventors: Akira Nuita; Katsuhiko Kawaguchi, both of Shizuoka, Japan

[73] Assignee: Tokyo Electric Co., Ltd., Tokyo, Japan

[21] Appl. No.: 487,447

[22] Filed: Mar. 2, 1990

[30] Foreign Application Priority Data

Mar. 6, 1989 [JP] Japan .............................. 1-25467[U]

Apr. 7, 1989 [JP] Japan .............................. 1-41261[U]

[51] Int. Cl.[5] .............................. G01D 15/10

[52] U.S. Cl. .............................. 346/76 PH

[58] Field of Search .............................. 346/76 PH

[56] References Cited

U.S. PATENT DOCUMENTS 4,297,039 10/1981 Lees .............................. 400/120

4,910,602 3/1990 Sakugari .............................. 346/76 PH 4,940,994 7/1990 Habelt et al. .............................. 346/76 PH

FOREIGN PATENT DOCUMENTS 0311982 4/1989 European Pat. Off. .

3535767 4/1986 Fed. Rep. of Germany .

2294854 7/1976 France .

8806100 8/1988 World Int. Prop. O. .

OTHER PUBLICATIONS

Patent Abstracts of Japan, vol. 10, No. 249 (M-511) (2305), Aug. 27, 1986; JP-A-61078681 (Matsushita Electric Ind. Co. Ltd.) 04/22/86.

*Primary Examiner*—Benjamin R. Fuller

*Assistant Examiner*—Nancy Le

*Attorney, Agent, or Firm*—Oblon, Spivak, McClelland, Maier & Neustadt

[57] ABSTRACT

In a thermal printer according to the present invention, a platen can be mounted in a pressed abutted condition against a thermal head by fixing the platen in a state where the platen is pressed toward a thermal head which is fixedly provided, and when the pressed abutted condition is released by the operation of a release lever the platen is floated in a free condition and it can be easily taken out.

3 Claims, 8 Drawing Sheets

THERMAL PRINTER HAVING A PLATEN WHICH CAN BE PRESSED AGAINST A THERMAL HEAD

FIELD OF THE INVENTION AND RELATED ART STATEMENT

The present invention relates to a thermal printer of a type in which a thermal head is pressed and abutted against a cylindrical platen.

A Japanese utility model, laid open No. 86360/83, is shown in FIG. 14. In the figure, a thermal printer which has a constitution as shown in the following is illustrated: a movable body 52 is fixed on a frame 51, which holds a platen 50, to be freely rotatable and freely movable up and down with a supporting shaft 53; a lock lever 54 for locking the movable body 52 is fixed freely rotatably on the movable body 52, and an end of a leaf spring 56 for supporting a thermal head 55 is fixed on the movable body 52.

In the thermal printer of this type, a thermal head is made to elastically touch a blank sheet of paper 57 on the platen 50 for printing by the leaf spring 56. A blank sheet of paper to be printed is set between the platen 50 and the thermal head 55 by rotating the lock lever 54 clockwise and by making the movable body 52 retreat upward together with the thermal head 55.

As the number of heating elements for the thermal head 55 is large, the number of connecting lines for supplying power to the heating elements also becomes large. As the thermal head 55 is held by the movable body 52, a special holding tool is needed for preventing the vibration of connecting lines. To lower the temperature of the thermal head 55 a cooling plate is needed. Moreover, in FIG. 14, the movable body 52 works the role of a head cover; it is therefore preferable to cover the thermal head 55 for the prevention of a burn etc., which makes the constitution complicated. When a blank sheet of paper to be printed is set between the platen 50 and the thermal head 55, the movable body 52 has to be rotated and moved upward after taking off the lock lever 54, or else it is impossible to make a gap between the platen 50 and the thermal head 55.

OBJECT AND SUMMARY OF THE INVENTION

A first object of the present invention is to simplify the mounting/dismounting of a platen.

A second object of the present invention is to facilitate the control of the mounting/dismounting of a platen.

A third object of the present invention is to accurately decide the shaft center position of a platen against a thermal head which is fixedly provided.

A fourth object of the present invention is to facilitate the taking out of a platen by moving the shaft parts of the platen to the open port sides of dented parts when a release lever is rotated.

A fifth object of the present invention is to facilitate the manufacture of the fixing structure of a platen of easy mounting/dismounting.

A sixth object of the present invention is make the wiring to a thermal head easy.

In the present invention: a supporting shaft is provided freely rotatably on a head frame on which a thermal head is fixed; a couple of supporting levers, each of them having a dented part with an opening on an end and supporting the shaft part of a platen, are engaged on both ends of the supporting shaft freely rotatably; a first energizing means is provided which energizes the supporting levers toward the thermal head; a couple of stop levers having depression parts which abut on the external peripheral surfaces of the platen shaft parts are connected to the supporting levers freely rotatably with rotatable shafts parallel to the supporting shaft; a second energizing means is provided for energizing the stop levers in the direction to make the depressing parts move toward the bottoms of the dented parts; a couple of release levers are fixed on both ends of the supporting shaft; abutment parts are provided on the opposing surfaces of the stop levers and the release levers, at which both parts abut on each other; and hooks facing to the external peripheries of smaller diameter parts formed on the shaft parts of the platen at a specified clearance are positioned on the opening sides of the dented parts and are provided fixedly on the release levers.

As described in the above, the thermal head is fixed on the head frame in a fixed condition, therefore the handling of the connecting lines is made easy; the shaft parts on both ends of the platen are supported by dented parts of the supporting levers on both sides, so that the platen can be pressed and abutted against the thermal head by energizing the supporting levers with the first energizing means; furthermore, the floating up of the platen from the bottoms of the dented parts is prevented with the depression parts of the stop levers which are energized by the second energizing means; the shaft position of the platen is decided by the arrangement as described in the above; when the release lever is rotated, the rotating force is transmitted to the stop lever and makes the stop lever rotate against the force of the second energizing means; the above operation makes the depression part of the stop lever move to the lower side of the platen, and also it allows the supporting lever to rotate toward the thermal head by the first energizing means, and the platen shaft can be moved to the opening port side of the dented part with a component force generated by the abutment of a part of the dented part and the platen shaft; when the release lever is unhanded, the stop lever is returned by the second energizing means, and the return operation is transmitted to the release lever by the abutment part, which makes the release lever return; when the platen shaft is supported by the dented parts of the supporting levers, the falling off of the head frame and the parts fixed on the head frame can be certainly prevented by the engagement of the shaft parts of the platen and the hooks; in this case, the hooks are engaged with the smaller diameter parts formed on the platen shaft, so that the rotating stroke of the release lever for disengaging the hooks from the smaller diameter parts can be made small, and further in normal operation the depression parts of the stop levers are elastically abutted on the platen shaft to decide the platen position; as the hooks are faced to the shaft parts of the platen with clearance, the dimension management of the depression part of the stop lever and the hook can be roughly decided, which makes the manufacture of these parts easy.

DETAILED DESCRIPTION OF PREFERRED EMBODIMENTS

Figure 2:
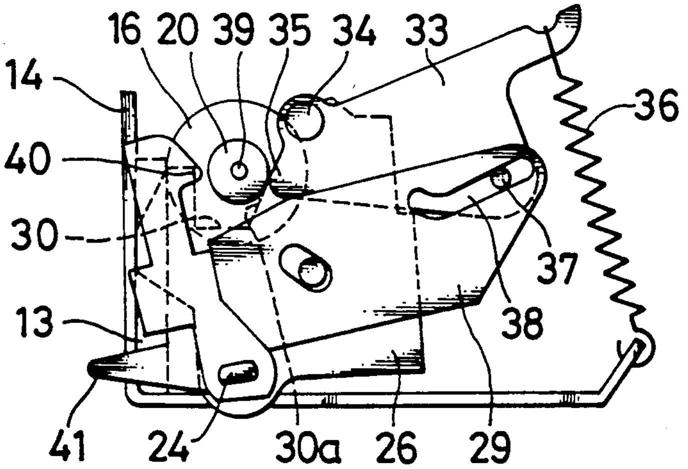
FIG. 2 is a side view showing a state where a release lever and a stop lever are rotated.
Figure 3:
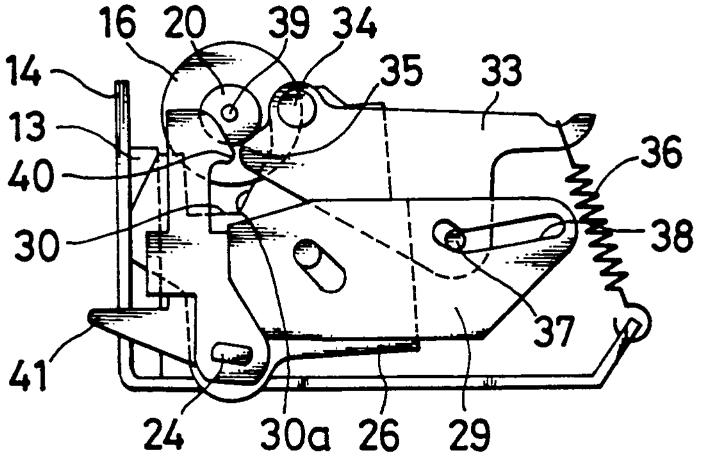
FIG. 3 is a side view showing a state where the release lever and the stop lever are returned.
Figure 4:
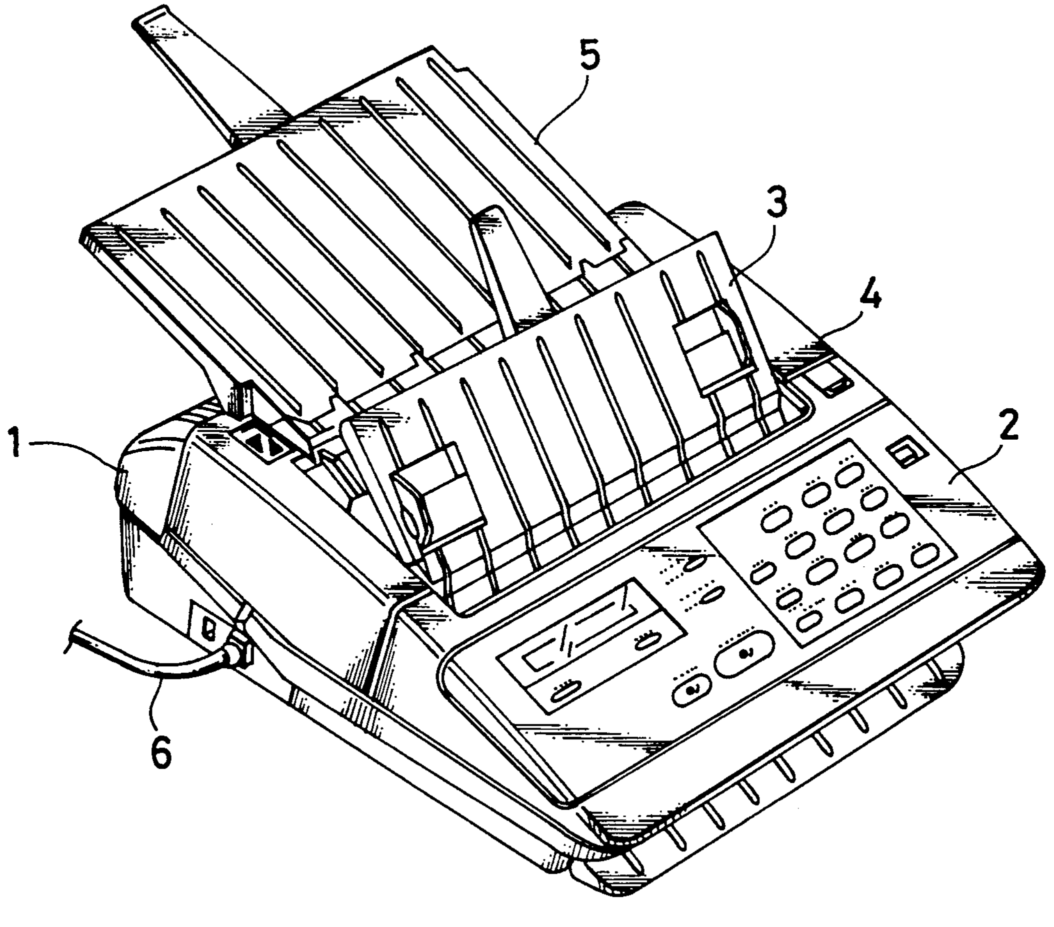
FIG. 4 is a perspective view showing a main body case of a facsimile device.

A first embodiment according to the present invention will be explained based on FIG. 1 to FIG. 9. In FIG. 4: 1 is a main body case of a facsimile device; the main body case 1 comprises a control section 2, a manuscript tray 3 and an opening/closing cover 4 which are inclined to make an upward slope toward rear; on the opening/closing cover 4 a recording paper tray 5 which is inclined to make an upward slope toward rear is provided; and 6 is a power supply cord.

Figure 5:
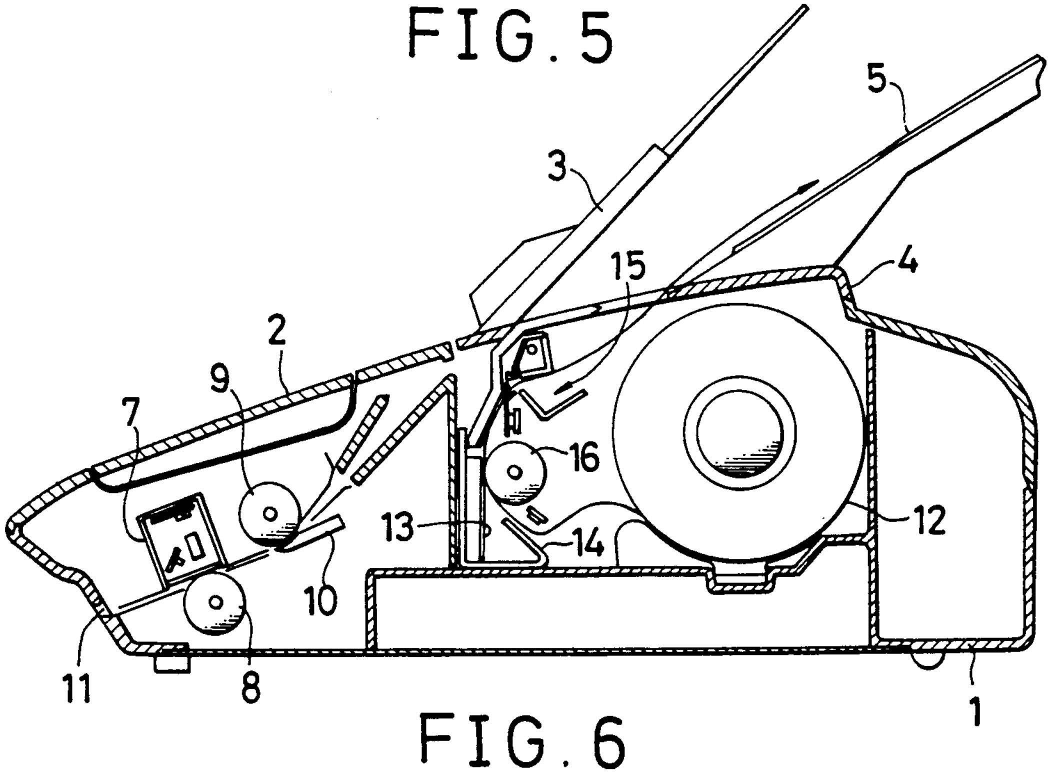
FIG. 5 is a longitudinal cross-sectional side view showing the internal structure of the main body case.
Figure 6:
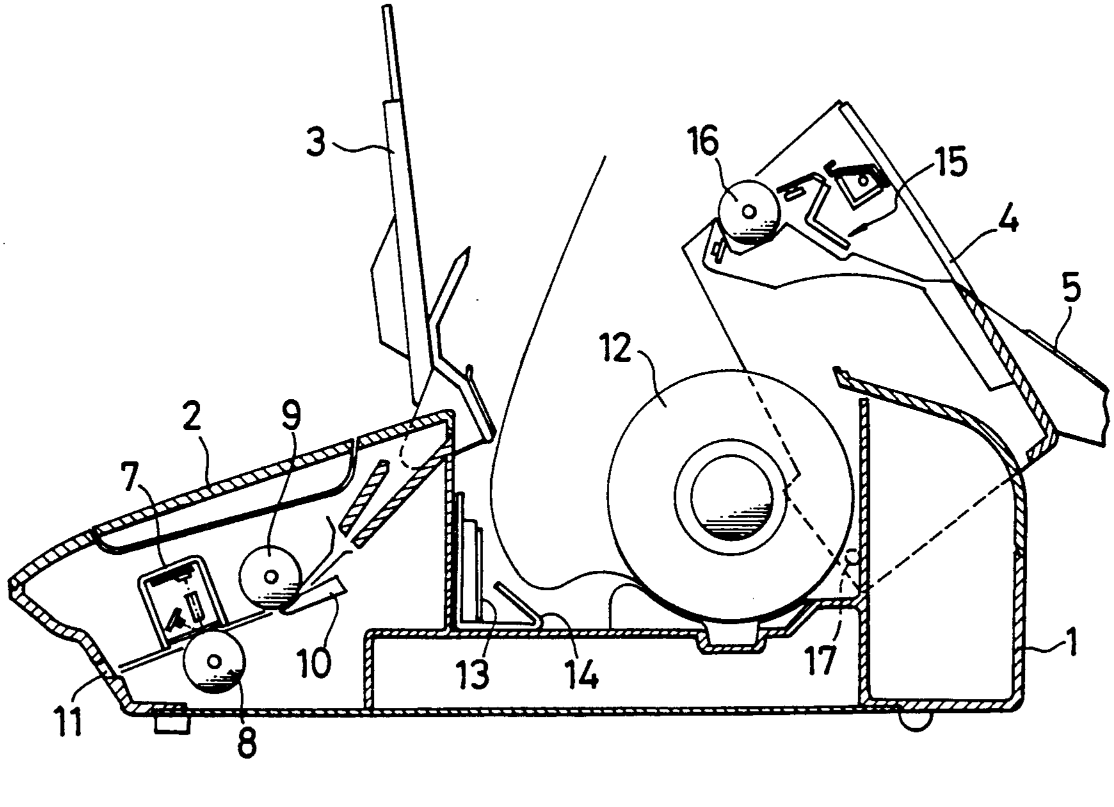
FIG. 6 is a longitudinal cross-sectional side view showing the state where an opening/closing cover of the main body case is opened.

FIG. 5 and FIG. 6 are longitudinal cross-sectional side views showing the inside of the main body case 1. On the extension plane of the manuscript tray 3 there are provided a paper supply roller 9 which puts a manuscript on the manuscript tray 3 between an image sensor 7 of a close adhesion type and a conveying roller 8, and a separation part 10 for preventing multiple feed of manuscripts which abuts on the paper supply roller 9. In front of the main body case 1 a manuscript discharge port 11 is formed, which discharges a manuscript supplied from the manuscript tray 3 and the contents are read with the image sensor 7. A thermal head 13 for printing a thermosensible paper 12 is provided being held by a head frame 14. A cutting mechanism 15 for cutting the thermosensible paper 12 is mounted under the opening/closing cover 4, and a platen 16 for touching the thermal head 13 is also held by the opening/closing cover 4. In other words, after the thermosensible paper 12 is printed with the thermal head 13 it is cut with the cutting mechanism 15 and then it is discharged to a recording paper tray 5. In the case of the supply or the maintenance of the thermosensible paper 12 the opening/closing cover 4 is opened upward centering a supporting point 17 as shown in FIG. 6.

Figure 7:
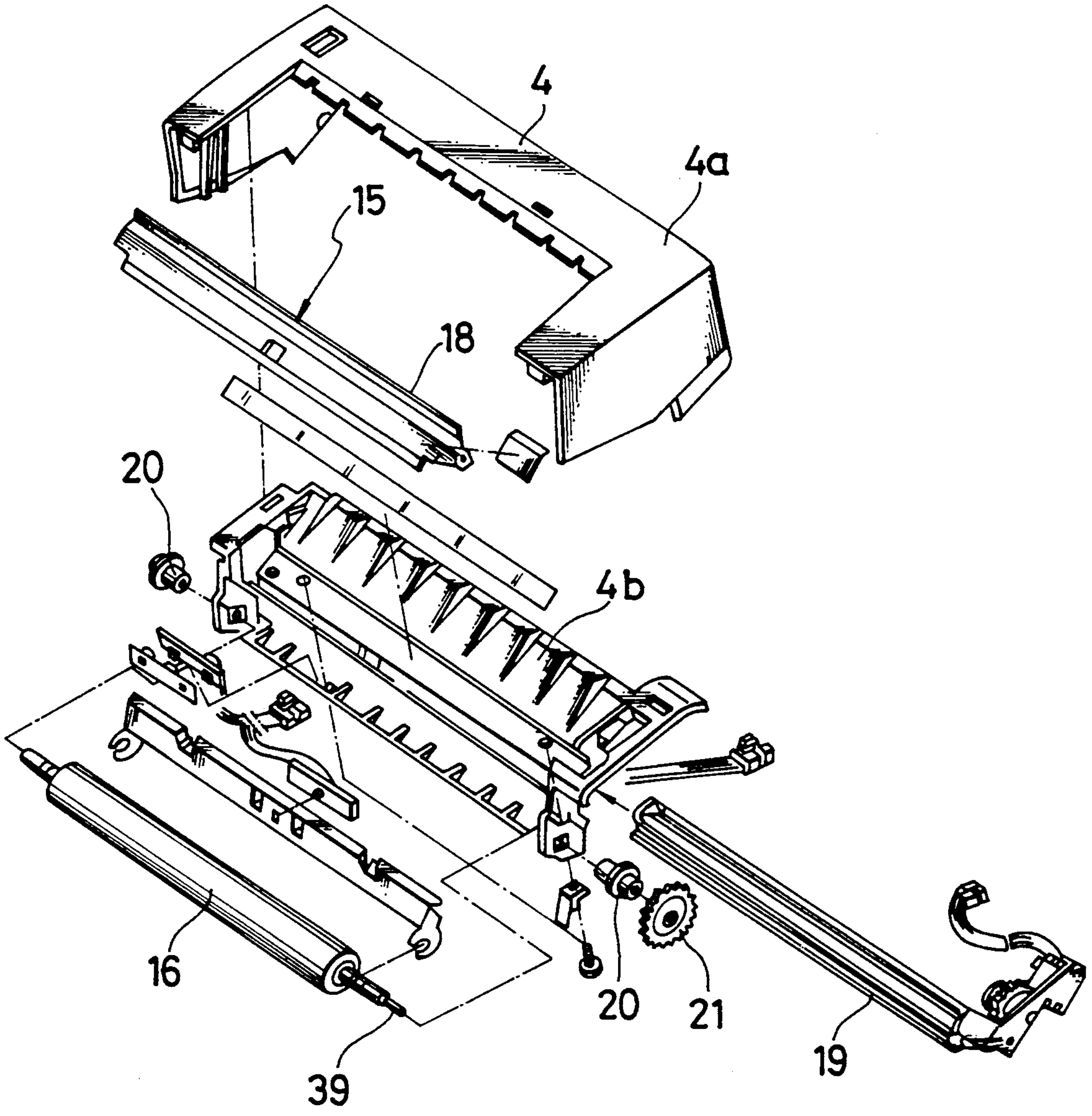
FIG. 7 is an exploded perspective view showing the assembly structure of parts for the opening/closing cover.

FIG. 7 is an exploded perspective view showing the fixing structure of parts for the opening/closing cover 4. The opening/closing cover 4 is formed by joining two upper and lower members 4*a* and 4*b*. The cutting mechanism 15 mounted on the lower member 4*b* comprises an upper blade 18 and a lower blade 19 which can move relatively. Bearings 20 which constitute the shaft parts on both ends of the platen 16 are engaged with both sides of the lower member 4*b* of the opening/closing cover 4 with a play to be able to move a little in the direction perpendicular to that of the shaft center of the platen 16. A platen gear 21 is fixed on the right end of the platen 16.

Figure 8:
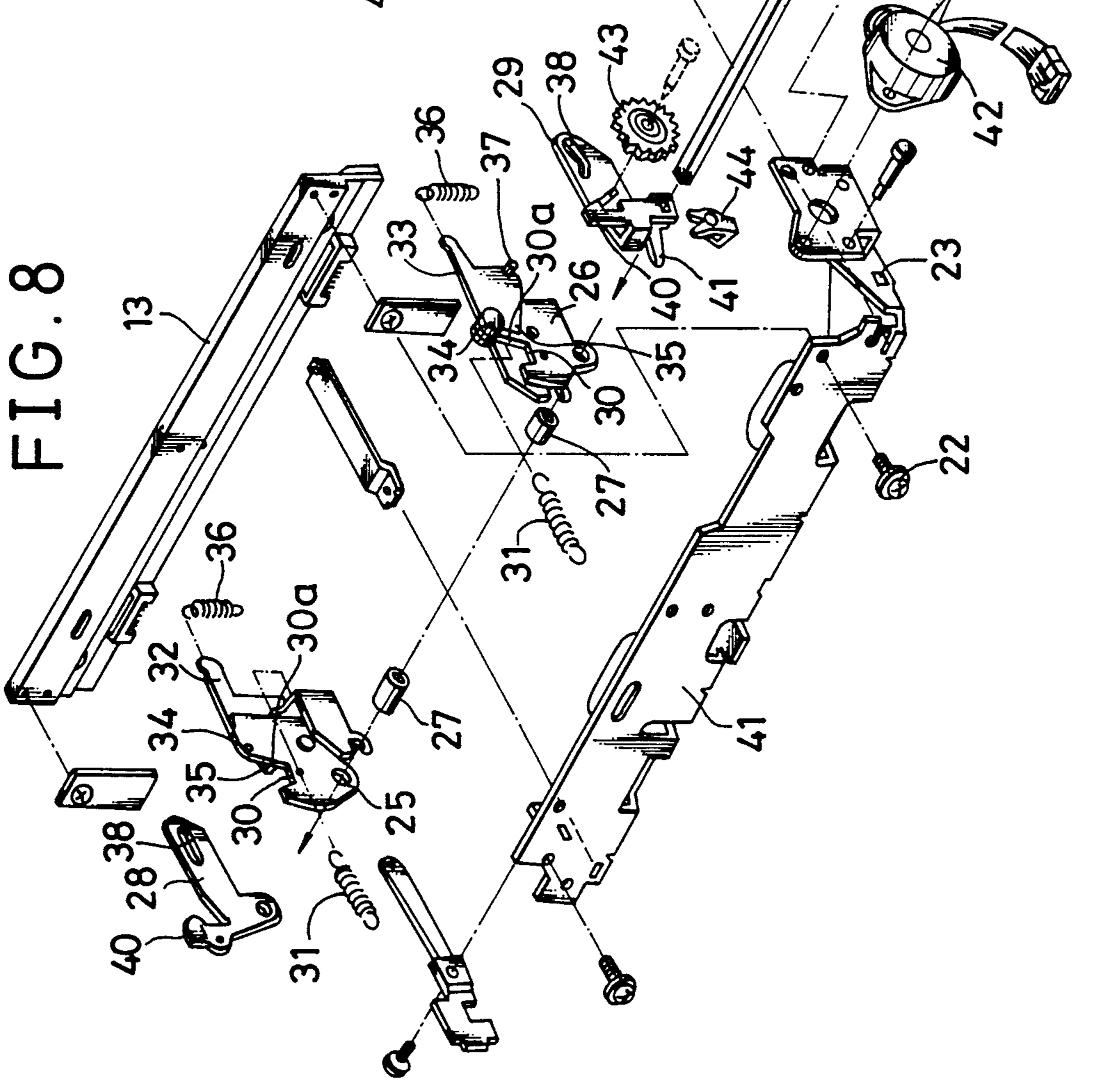
FIG. 8 is an exploded perspective view showing assembling relations among the supporting levers, the release levers, the stop levers, etc.

A supporting shaft 24 having a square cross section is engaged freely rotatably with the holes 23 formed on both sides of the head frame 14 which holds the thermal head 13 with screws 22 as shown in FIG. 8. A couple of supporting levers 25 and 26 are engaged freely rotatably with both ends of the supporting shaft 24 through bearings 27. A couple of release levers 28 and 29, right and left, and the supporting shaft 24 are engaged with the relation of a deformed shaft and deformed holes to be rotated in a unity. The supporting levers 25 and 26 have trapezoidal dented parts 30 which have upward openings for supporting with engagement the bearings 20 of the platen 16, and the supporting levers 25 and 26 are, together with the platen 16, energized towards the thermal head 13 side by fixing both ends of a spring 31, a first energizing means, on the supporting levers 25 and 26, and the head frame 14. A slant surface 30*a* is formed which is slanted to widen the dented part 30 in proceeding upward in a part of the dented part 30 on the opposite side to the thermal head 13. Stop levers 32 and 33 are respectively fixed on the supporting levers 25 and 26 freely rotatably with a pin 17 having a shaft center parallel to the supporting shaft 24. These stop levers 32 and 33 have depression parts 35 which abut on the outer peripheries of the bearings 20 fixed on both ends of the platen 16. The abutting surface of the depression part 35 and the bearing 20 forms a curved surface and the radius of curvature centering the pin 34 is designed to continuously grow larger as the surface extends lower. Both ends of a spring 36, a second energizing means, are fixed on the rotatable ends of the stop levers 32 and 33, and the head frame 14. Protruded parts 37, abutment parts, are provided on the side surfaces of the stop levers 32 and 33, and on the side surfaces of the release levers 28 and 29 longish holes 38, abutment parts, for engaging with protruded parts 37 are formed. The protruded parts 37 are disposed in distant positions from the rotating shaft center of stop levers 32 and 33 (pins 34) and the shaft center of the supporting shaft 24, and the longish holes 38 are formed along the direction crossing with the rotating direction of stop levers 32 and 33, and release levers 28 and 29. Hooks 40 are formed facing the upper parts of the outer peripheries of the smaller diameter parts provided on both ends of the shaft of the platen 16, and a handle 41 is formed on the release lever 29 on the right side. The part 42 is a motor fixed on the right side end of the head frame 13, and a driving gear 43 to be engaged with the platen gear 21 are connected to the motor 42. The supporting shaft 24 is prevented from the movement in the axial direction by a stopper 44 held on the side surface of the head frame 14.

Figure 1:
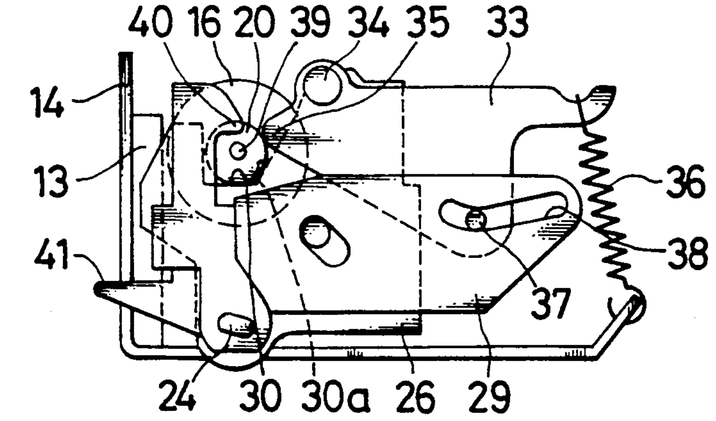
FIG. 1 is a side view showing a first embodiment in normal operation according to the present invention.

FIG. 1 is a side view showing the assembly structure of the supporting levers 25 and 26, the release levers 28 and 29, and the stop levers 32 and 33, and in the figure the right side wall of the head frame 14 is omitted for the purpose of illustration.

In the constitution as shown in FIG. 1, as the supporting levers 25 and 26 are energized counterclockwise centering the supporting shaft 24 by a spring 31, the platen 16 held with dented parts 30 of the supporting levers 25 and 26 through the bearings 20 abuts on the thermal head 13 elastically. In this state, the bearings 20 of the platen 16, being depressed by the slanting surface 30*a* of the trapezoidal dented part 30, is depressed toward the opening port of the dented part 30 (upwards), but when the stop levers 32 and 33 are energized clockwise centering the pin 34 by a spring 36, the depression part 35 of these stop levers 32 and 33 depresses the bearings 20 with the energizing force; the radius of curvature centering the pin 34 of the curved surface of the depression part 35 is designed to be larger continuously with the downward movement of the stop levers 32 and 33; the bearings 20 are therefore depressed against the bottom of the dented part 30 by the depression part 35, which maintains the position of the shaft center of the platen 16 at its regular position.

When a blank sheet of paper is to be set between the thermal head 13 and the platen 16, the handle of the release lever 29 on the right side is depressed. As shown in FIG. 2, the release levers on both sides 28 and 29, and the supporting shaft 24 are rotated counterclockwise as a unity, and the hooks 40 are moved to the sides of the bearings 20 by the above operation. At this time, with the abutment of the protruded parts 37 and the upper rims of the longish holes 38 the rotating force of the release levers 28 and 29 is transmitted to the stop levers 32 and 33, and the stop levers 32 and 33 are rotated counterclockwise against the force of the spring 36 making the pin 34 as a rotation shaft center. In this case, the radius of curvature of the depression part 35 centering the pin 34 is designed to be larger continuously with the downward movement of the depression part 35, so that the depression part 35 is moved back from the bearing 20 little by little. In this process, the supporting levers 25 and 26 being energized by the spring 31 are rotated towards the thermal head 13 centering the supporting shaft 24, and the bearings 20 are pushed upwards and are moved to the upper part of the depression part 35 by a component force generated by the abutment with the slant surfaces 30*a* of the dented parts 30 of the supporting levers 25 and 26. In other words, the bearings 20 are depressed to the positions in which the bearings 20 are able to interfere sufficiently in the rotation locus of the tip of the depression part 35. In this state also the platen 16 is completely released but when the release lever 29 is unhanded, as shown in FIG. 3, the stop levers 32 and 33 are rotated by the force of the springs 36 clockwise centering the pins 34, so that the bearings 20 can be pushed upward together with the platen 16. Therefore, both ends of the platen 16 can be released and also the platen 16 can be detached from the thermal head 13 by depressing the release lever 29 on one side only once. This improves the operability in setting a blank sheet of paper.

When a blank sheet of paper is set, the opening/closing cover 4 is opened in the state as shown in FIG. 3. After the paper is set, by closing the opening/closing cover 4 the bearings 20 descend to the lower part of the hooks 40 and the depression parts 35 in pushing aside the hooks 40 of release levers 28 and 29, and the depression parts 35 of the stop levers to both sides. Thus normal operation as shown in FIG. 1 is recovered.

The thermal head 13 is held by the head frame 14 which can have a large heat radiating surface and so the function of heat radiation can be expedited; there is no need to use heat radiators and to prepare a head cover for covering the thermal head 13; furthermore, as the thermal head 13 is fixed on the fixed head frame 14, the connecting lines for supplying power are not vibrated and the fixing structure of the connecting lines can be simplified; the supporting levers 25 and 26, release levers 28 and 29 can be held with a supporting shaft 24, which makes the structure of the device simple.

When the opening/closing cover 4 is lifted up together with the platen 16, the weight of the main body case 1 and the parts inside the case is levied on the platen 16, so that the platen 16 can be floated from the dented part 30, but owing to the engagement of the shaft parts of the platen 16 and the hooks 40 it can be certainly prevented that the main body case 1 hits a floor being opened and hung down caused by the disengagement of the main body case 1 and the opening/closing cover 4. As the hooks 40 are engaged with the small diameter parts 39 formed on the shaft parts of the platen 16, so that the rotating strokes of the release levers 28 and 29 for disengaging the hooks 40 from the small diameter parts 39 can be made small. Usually the position of the platen 16 is decided by elastic abutment on the depression parts of the stop levers 32 and 33, and the hooks 40 are opposed to the platen 16 with a gap, so that the dimension management of the depression parts of the stop levers 32 and 33, and the hooks 40 can be decided roughly, which facilitates the manufacture of the device. In the case where the small diameter parts 39 are provided on the outer peripheries of the bearings 20 too, the similar function to that described in the above can be obtained.

Figure 9:
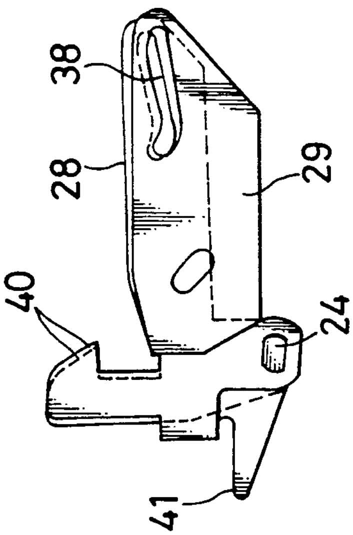
FIG. 9 is a side view showing the relations of release levers right and left for the supporting shaft.

The release levers 28 and 29 on both sides are engaged with both ends of the supporting shaft 24 and they are rotated together with the supporting shaft 24 as a unity, but when there are clearances in the engaging parts of the supporting shaft 24 and the release levers 28 and 29, a time delay can occur in the transmission of a force, from the release lever 29 to the supporting shaft 24, from the supporting shaft 24 to the other side release lever 28; as shown in FIG. 9 however by engaging the release levers 28 and 29 fixedly with both ends of the supporting shaft 24 in shifting the fixing angle of a release lever 28 a little counterclockwise against that of the release lever 29 on the other side having the handle 41 the time delay in rotating operation can be prevented and the operation of the depression parts 35 for the bearings 20 on both sides can be made identical.

When dented parts 30 are formed on the supporting levers 25 and 26, if the dented parts have straight or curved slant surfaces where component forces for depressing the shaft parts of the platen 16 toward the opening/closing cover 4 is generated by the movement of supporting levers 25 and 26 toward the thermal head 13, the shapes of the dented parts 30 are not limited to trapezoidal shapes and their shapes can be V shapes, U shapes or other shapes.

Figure 12:
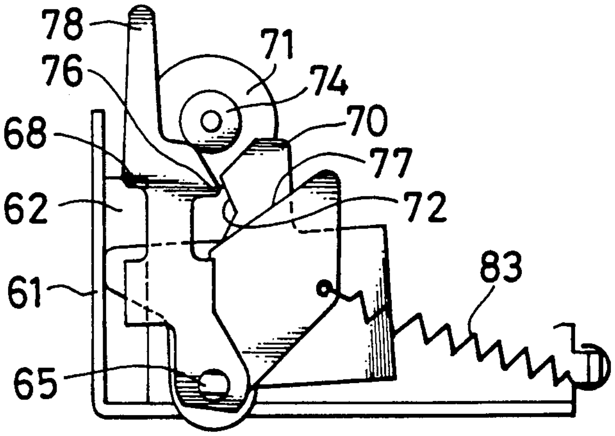
FIG. 12 is a side view showing the state where the release lever and the supporting lever are returned.
Figure 13:
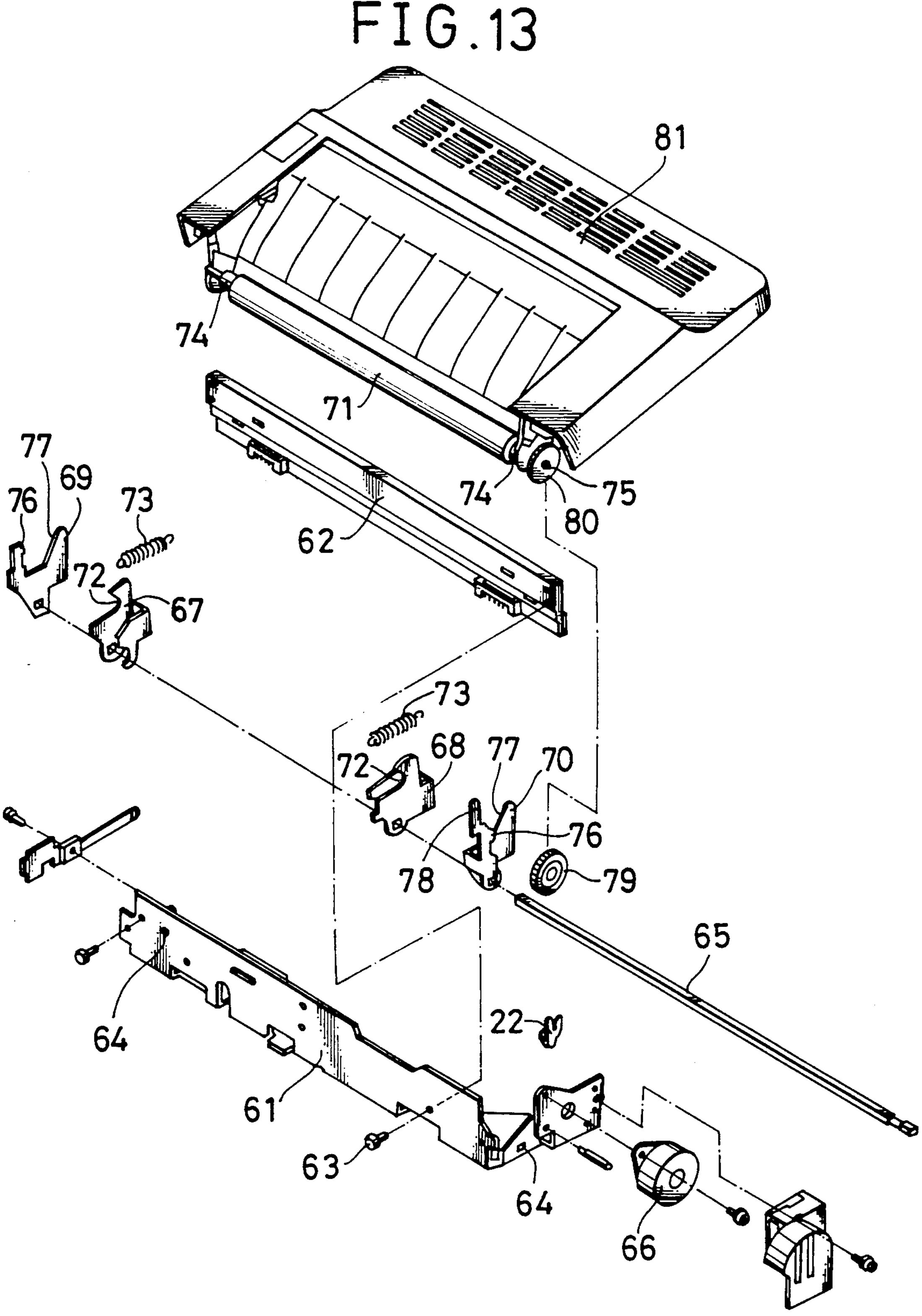
FIG. 13 is an exploded perspective view.
Figure 14:
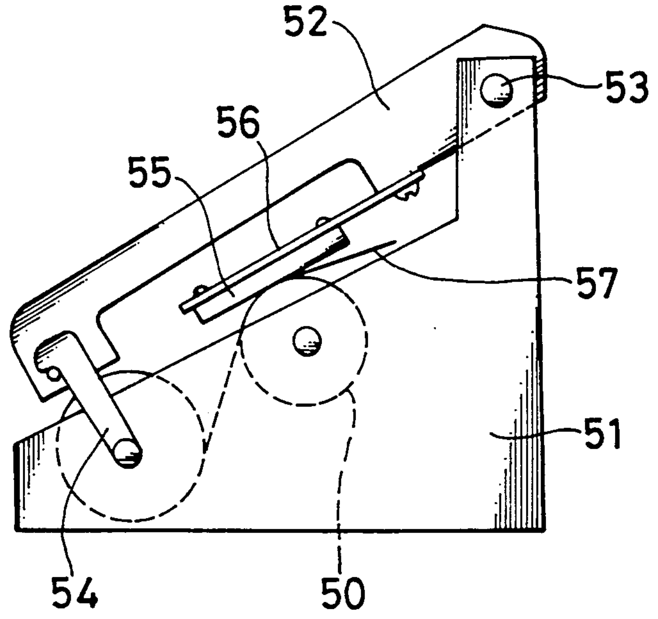
FIG. 14 (PRIOR ART)
FIG. 14 is a side view showing an example of a conventional device.

A second embodiment will be explained based on FIG. 10 to FIG. 13 in the following. FIG. 13 is an exploded perspective view. In the figure, 61 is a fixedly disposed frame, and on the frame 61 a thermal head 62 which is long sideways is fixed with screws 63. Supporting shafts 65 are freely rotatably engaged in the holes 64 formed on both sides of the frame 61. On the right side of the frame 61 a motor 66 is fixed. A couple of right and left supporting levers 67 and 68 are freely rotatably engaged with both ends of the supporting shaft 65 and a couple of right and left release levers 69 and 70 are fixed on the ends of the supporting shaft 65. These release levers 69 and 70 are engaged with the supporting shaft 65 with the relation of a deformed shaft and deformed holes. The supporting levers 67 and 68 have dented parts 72 which are engaged with shaft parts on both ends of the platen 71 through bearings 74, and the supporting levers 67 and 68 are energized toward the thermal head 62 together with the platen 71 by fixing both ends of a spring 73, a first energizing means, on the supporting levers 67 and 68, and the frame 61. The dented parts 72 are formed in V shapes and are opened toward the thermal head 62. Hooks 76 which are facing, with a specified gap, to the upper parts of the external peripheries of small diameter parts 75 which are formed on both ends of the shaft parts of the platen 71 being opposed to the dented parts 72, and opposition parts 77 which are opposed to the bearings 74 on the opposite side to the hooks 76 are formed on the release levers 69 and 70 on both sides. A handle 78 is formed on the release lever 70 on the right side. A part 79 is a driving gear directly coupled with the motor 66; a platen gear 80 being engaged with the driving gear 79 is fixedly engaged with an end of the shaft part of the platen 71. The bearings 74 of the platen 71 are held with a cover 81. The cover 81 is held, to be freely opened and closed, by the main frame of the printer (not shown in the drawings) on the opening surface in the upper part. The supporting shaft 65 is prevented from the movement in the axial direction by a stopper 82 held on the side surface of the frame 61.

Figure 10:
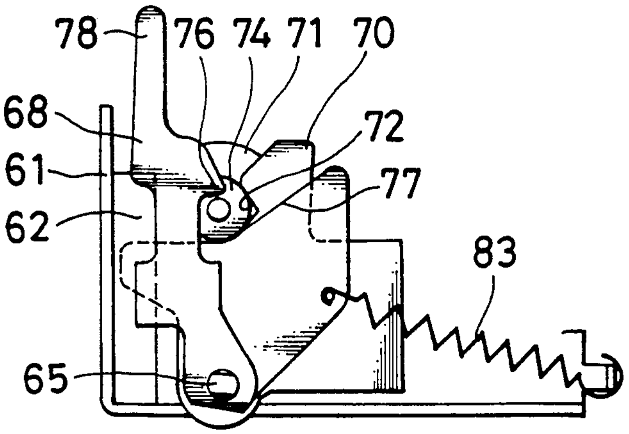
FIG. 10 is a side view of a second embodiment in normal operation according to the present invention.
Figure 11:
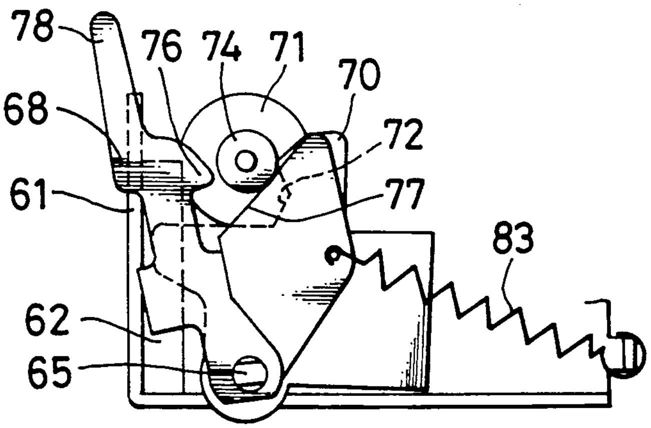
FIG. 11 is a side view showing the state where the release lever and the supporting lever are rotated.

FIG. 10 is a side view showing the assembly structure of the supporting levers 67 and 68, and the release levers 69 and 70; for the purpose of illustration the right side wall of the frame 61 is omitted. The release levers 69 and 70 are energized clockwise by springs 83, a second energizing means, opposite to the energizing direction for the supporting levers 67 and 68.

In the constitution as mentioned in the above, as the supporting levers 67 and 68 are energized counterclockwise centering the supporting shaft 65 by springs 73 as shown in FIG. 10, the platen 71 held by the dented parts 72 of the supporting levers 67 and 68 through the bearings 74 is elastically abutted on the thermal head 62. The dented parts 72 are V shaped, therefore the position of the shaft center of the platen 71 is kept at a regular position.

When a blank sheet of paper is set between the thermal head 62 and the platen 71 the handle 78 of the release lever 70 on the right side is depressed counterclockwise. With this operation the release levers on both sides 69 and 70, and the supporting shaft 65 are rotated counterclockwise as a unity, and the hooks 76 retreat toward the side of the bearings 74, and the opposition parts 77 push up the bearings 74. When the release lever 70 is unhanded release levers 69 and 70 are rotated clockwise together with the supporting shaft 65 by the force of the springs 83 as shown in FIG. 12. In this way, both ends of the platen 71 can be released and also the platen 71 can be detached from the thermal head 62 by depressing the release lever 70 only once. It is thus made possible to improve the operability when a blank sheet of paper is set.

When a blank sheet of paper is to be set, the cover 81 is opened in the state as shown in FIG. 12. After the setting of a paper by closing the cover 81, the bearings 74 of the platen 71 descend to be elastically engaged with the dented part 72 in pushing the release levers 69 and 70, and the supporting levers 67 and 68 aside. In other words the printer is returned to normal operation as shown in FIG. 10.

As the thermal head 62 is held by the frame 61 which is able to have a large heat radiation area, heat radiation function can be expedited and there is no need to have any heat radiation plate separately and moreover a head cover for covering the thermal head 62 is not needed. Furthermore as the thermal head is fixed on a fixed frame 61, connecting lines for supplying power are not vibrated, which makes the fixing structure of connecting lines simple, and the supporting levers 67 and 68, and the release levers 69 and 70 can be supported with a single supporting shaft 65, which makes the structure of the printer simple.

Following are alternative ways: the shaft part of the platen 71 can be directly engaged with the dented parts of supporting levers 67 and 68; the opposition parts 77 can push up directly the shaft parts of the platen 71; and the hooks 76 can be engaged with the bearings 74.

What is claimed is:

1. A thermal printer comprising:

a platen having shaft parts on each end thereof;

a head frame;

a thermal head fixedly mounted on said head frame;

a supporting shaft rotatably mounted on said head frame;

first and second supporting levers rotatably mounted on both sides of said supporting shaft, each of said first and second supporting levers comprising an opening for supporting the shaft parts of said platen;

a first energizing means for energizing said supporting levers in a direction of movement toward said thermal head;

first and second stop levers rotatably mounted on said first and second supporting levers, each of said first and second stop levers comprising depression parts for abutting against external peripheral surfaces of said shaft parts of said platen, said first and second stop levers further comprising a pin having a shaft center which is parallel to said supporting shaft;

a second energizing means for energizing said first and second stop levers in order to move said depression parts of said stop levers toward a lower portion of the opening of said first and second supporting levers;

first and second release levers fixedly mounted on both ends of said supporting shaft;

abutment parts disposed on opposing surfaces of said stop levers and said release levers for abutting on each other and transmitting force between said stop levers and said release levers; and hooks formed on a portion of said openings of each of said first and second supporting levers, said hooks facing, with a predetermined gap, an outer periphery of small diameter parts formed on said shaft parts of said platen.

2. A thermal printer according to claim 1 having a further release lever comprising a handle protruding toward a front side of said printer.

3. A thermal printer comprising:

a platen having shaft parts on each end thereof;

a frame;

a thermal head fixed on said frame;

a supporting shaft rotatably mounted on said frame;

first and second supporting levers rotatably mounted on both sides of said supporting shaft, each of said first and second supporting levers comprising an opening which opens toward said thermal head, said openings of each of said first and second supporting levers engaging with an outer periphery of each the shaft parts of said platen;

a first energizing means for energizing said supporting levers in a direction of movement toward said thermal head;

first and second release levers fixedly mounted on both ends of said supporting shaft and having hooks facing the outer periphery of each of said of the shaft parts of said platen, said hooks being positioned opposite to said openings of each of said first and second supporting levers, each of said first and second release levers further comprising opposition parts disposed opposite to said hooks and opposing the outer periphery of each of said shaft parts of said platen; and a second energizing means for energizing said release levers in a direction opposite to the direction of movement caused by said first energizing means.

* * * * *